(12) United States Patent
Lemaire et al.

(10) Patent No.: US 6,574,408 B2
(45) Date of Patent: Jun. 3, 2003

(54) MONOMODE OPTICAL FIBRE

(75) Inventors: Philippe Lemaire, Liege (BE); Veronique Scauflaire, Montzen (BE)

(73) Assignee: Universite de Liege, Liege (BE)

( * ) Notice: Subject to any disclaimer, the term of this patent is extended or adjusted under 35 U.S.C. 154(b) by 0 days.

(21) Appl. No.: 09/955,284

(22) Filed: Sep. 19, 2001

(65) Prior Publication Data

US 2002/0067904 A1 Jun. 6, 2002

Related U.S. Application Data

(63) Continuation-in-part of application No. 09/749,793, filed on Dec. 28, 2000, now abandoned.

(30) Foreign Application Priority Data

Sep. 14, 2000 (EP) .............................................. 00203181

(51) Int. Cl.$^7$ ................................................. G02B 6/02
(52) U.S. Cl. ...................... 385/127; 385/123; 385/126; 385/128
(58) Field of Search ................................ 385/123, 126, 385/127, 128

(56) References Cited

U.S. PATENT DOCUMENTS

| | | | |
|---|---|---|---|
| 3,997,241 A | 12/1976 | Nishida et al. | 350/96 |
| 4,089,586 A | 5/1978 | French et al. | 350/96 |
| 4,372,647 A | * 2/1983 | Okamoto et al. | 385/127 |
| 4,691,990 A | 9/1987 | Cohen et al. | 350/96 |
| 4,784,466 A | * 11/1988 | Khoe et al. | 350/96.33 |
| 4,802,733 A | 2/1989 | Bachmann et al. | 350/96 |
| 4,836,643 A | * 6/1989 | France et al. | 350/96.34 |
| 4,974,932 A | * 12/1990 | Nattermann et al. | 385/124 |
| 5,106,402 A | * 4/1992 | Geittner et al. | 65/3.12 |
| 5,170,457 A | 12/1992 | Jen | 385/123 |
| 5,182,783 A | * 1/1993 | Bosc et al. | 385/123 |
| 5,422,897 A | 6/1995 | Wyatt et al. | 372/6 |
| 5,553,185 A | 9/1996 | Antos et al. | 385/127 |
| 5,640,473 A | 6/1997 | Wheeler et al. | 385/27 |
| 5,835,655 A | 11/1998 | Liu et al. | 385/124 |
| 5,848,125 A | 12/1998 | Arnett | 378/162 |
| 6,212,310 B1 | 4/2001 | Waarts et al. | 385/24 |

FOREIGN PATENT DOCUMENTS

| | | |
|---|---|---|
| DE | 3128174 A1 | 2/1983 |
| GB | 1412884 | 11/1975 |

* cited by examiner

*Primary Examiner*—Akm E. Ullah
*Assistant Examiner*—Jennifer Doan
(74) *Attorney, Agent, or Firm*—Jacobson Holman PLLC

(57) ABSTRACT

A monomode optical fiber provided for transporting light having a wavelength λ comprised between 480 and 550 nm. The fiber comprises a core made of a first transparent dielectric material, having a first refractive index $n_c$ and a substantially circular cross-section with a radius dimension a. The fiber further comprises a first cladding coaxially applied on said core and made of a second transparent dielectric material having a second refractive index $n_{m1}$, wherein $n_{m1} < n_c$. The first transparent dielectric material consists in substantially pure silica, the second transparent dielectric material consists in doped silica, the thickness of the first cladding is comprised in a range of 5 to 15 μm, the values of $n_c$ and $n_{m1}$ are chosen in such a manner that the numerical aperture (NA=$\sqrt{n_c^2 - n_{m1}^2}$) is less than 0.1 and the said radius dimension a is above 2 μm.

13 Claims, 5 Drawing Sheets

MONOMODE OPTICAL FIBRE

This is a Continuation-in-Part of U.S. Ser. No. 09/749,793 filed Dec. 28, 2000 now abandoned.

BACKGROUND OF THE INVENTION

1. Field of the Invention

The invention relates to a monomode optical fibre provided for transporting light having a wavelength λ with $480 \leq \lambda \leq 550$ nm. The fibre comprises a core made of a first transparent dielectric material, having a first refractive index $n_c$ and a substantially circular cross-section with a radius dimension a and a first cladding coaxially applied on said core and made of a second transparent dielectric material having a second refractive index $n_{m1}$, wherein $n_{m1} < n_c$.

2. Prior Art

Such a monomode optical fibre is known from U.S. Pat. No. 3,997,241. The known optical fibre has a core surrounded by the first and a second cladding. The first refractive index being higher than a second refractive index of the second cladding. The purpose of using two different materials with respective refractive indices is to reduce the transmission loss occurring when the fibre is bent. The use of a monomode optical fibre is imposed by the constraint that the spatial coherence of the transmitted laser light should be maintained.

A drawback of the known optical fibres is that there is a severe limitation inhibiting a transport of multi-watt laser light. This limitation is caused by a non-linear optical effect, called Brillouin scattering threshold, imposing a threshold $P_B$ beyond which the light is no longer transmitted by the optical fibre.

SUMMARY OF THE INVENTION

It is an object of the present invention to realise a monomode optical fibre enabling an efficient light transport even with light intensities hi her than 4W.

For this purpose, a monomode optical fibre according to the present invention is characterised in that the first transparent dielectric material consists in substantially pure silica, the second transparent dielectric material consists in doped silica, the thickness of the said first cladding is comprised in a range of 5 to 15 μm, the values of $n_c$ and $n_{m1}$ are chosen in such a manner that the numerical aperture (NA=$\sqrt{n_c^2 - n_{m1}^2}$) is less than 0.1 and the radius dimension a is above 2 μm.

Silica is particularly suitable for optical fibre and can easily be doped. The use of doped silica for the second material enables to select an adequate doping substance in order to obtain the required numerical aperture. Moreover, the combination of doped silica with pure silica enables to easily combine the different subsequent materials.

The Brillouin scattering threshold is mainly determined by the cross-section of the core and the effective length of the fibre. Since a monomode fibre is used, the following equation has to be satisfied:

$$2\pi a \ NA/\lambda < 2.401$$

where λ is the wavelength of the transported light. So by choosing the refractive indices of the two transparent materials in such a manner that NA<0.1, it is possible to increase the radius a of the core without getting into conflict with the above mentioned equation. Since the Brillouin scattering threshold is mainly determined by the cross-section of the core, an increase of the cross-section enables to raise that threshold value and consequently the power of the transmitted light. The composition of the fibber core, consisting of substantially pure silica, helps permitting transmission of high power through the fibber according to the invention without lowering the core transparency and consequently the transmissivity of the fibber due to absorption of energy in the said core, as with a fibber core made for example of doped silica. The considered purity is maintained namely due to the low thickness of the first cladding of the fibber, made of doped silica. Indeed, such a low thickness avoids migration of doping agents from the cladding into the core of the fibber, especially during the manufacturing process of the latter.

A first preferred embodiment of a monomode optical fibre according to the present invention is characterised in that the doping agent of the said second transparent dielectric material is chosen amongst fluorine and boron. These doping agents conveniently enable the adjustment of $n_{m1}$, without migrating into the fibber core so that to damage its transmissivity properties when transmitting energy, as it is the case with other doping agents, such as OH ions.

Preferably, the doping agent in the second transparent dielectric material is present in a molar concentration range of 1 to 3 percents. Such concentrations enable to obtain a low NA value without leading to risk of diffusion of doping agent into the fibber core.

In a second preferred embodiment of a monomode optical fiber according to the present invention, the numerical aperture NA of the fibber is adjusted in order to be above 0.03, preferably above 0.04, most preferably above 0.05. Such values are convenient to obtain a monomode optical fibber having a high Brillouin scattering threshold and whose core can present normal micro bending without enduring transmitted power leakage as with fibbers having very low NA values, i.e. below 0.03. A third preferred embodiment of a monomode optical fibre according to the present invention is characterised in that said fibre further comprises a second cladding coaxially applied on said first cladding and made of a third transparent dielectric material having a third refractive index $n_{m2}$, wherein $n_{m2} > n_{m1}$. The application of a second cladding enables to limit the dimension of the first cladding without affecting the characteristics of a cladding.

Preferably said first refractive index $n_c$ and said third refractive index $n_{m2}$ have a same value. In such a manner, the second cladding has the same refractive index as the one of the core and enables an easy manufacturing, preferably with the same material, that is substantially pure silica.

A fourth preferred embodiment of a monomode optical fibre according to the present invention is characterised in that said fibre in enveloped with a resilient material in such a manner as to limit the bending radius of the fibre to minimum 5 cm. By limiting the bending radius of the fibre, losses due to excessive bending are limited.

A fifth preferred embodiment of a monomode optical fibre according to the present invention is characterised in that an end-wall of the fibre has an inclined end-face having an inclination angle θ

$$\theta > \frac{1}{2}\left[\frac{\pi}{2} - a\sin\left(\frac{n_c}{n_m}\right) + a\sin\left(\frac{NA}{n_c}\right)\right]$$

By imposing such an inclination angle, it is avoided that light reflecting against the end-wall would be reflected back into the fibre and would thus perturb the light transmitted through the fibre.

Preferably, an extremity of the fibre is provided with an end-piece having a cavity for receiving said extremity, a bottom of said cavity being provided with a hole through which said core extends. This enables an easy coupling of the fibre to the light source.

BRIEF DESCRIPTION OF THE DRAWINGS

The invention will now be described in more details with reference to the drawings, showing a preferred embodiment of an optical fibre according to the invention.

In the drawings.

DESCRIPTION OF THE INVENTION

Figure 1:
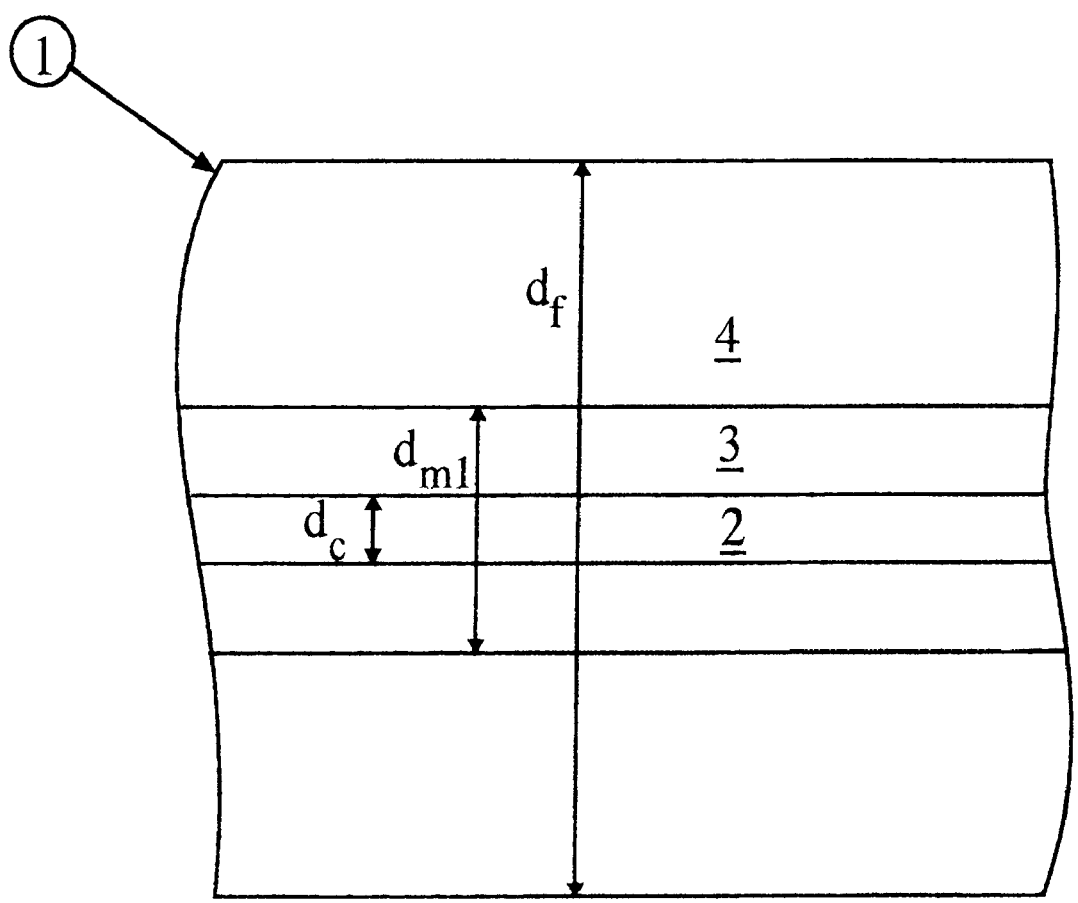
FIG. 1 shows a cross-section through the different layers of an optical fibre according to the present invention.

In the drawings a same reference sign has been assigned to a same or analogous element.

As illustrated in FIG. 1, the monomode optical fibre 1 comprises a core 2, surrounded by a first cladding 3 which is further surrounded by a second cladding 4. The optical fibre is provided for transporting light having a wavelength $\lambda$ situated between $480 \leq \lambda \leq 550$ nm. Typically the optical fibre is provided for transporting laser light.

The spatial coherence of the laser beam has to be accurately maintained in order to enable interferometric operations. Such operations are frequently applied in several technical domains. For such operations it is necessary to transport the laser beam from its source to the place where the operation has to be performed. Several constraints however limit an efficient transport of the laser beam, in particular when multi-watt visible or near infra-red light is concerned.

The main limitation is due to a non-linear optical effect called Brillouin scattering threshold. When the power of the light transmitted via a fibre is higher than that threshold $P_B$, that light can no longer be transmitted by means of the fibre. The value of that threshold is determined by two fibre parameters being the cross-section or effective area (A) of the fibre core 2, which is the place where the light is effectively transported, and the length of the fibre. This can be expressed as:

$$P_B = C_{br}/L_{eff} \quad (1).$$

where $C_{br}$ is the Brillouin scattering effect constant which is determined by the section of the fibber core as well as by the geometry and composition of the said fibber and where $$L\ eff = (1 - exp(\alpha L))/\alpha \quad (2)$$

L eff being the effective fibre length, $\alpha$ the absorption coefficient and L the physical length of the fibre. For light having a wavelength situated in the visible or near infra-red range, cc is small which signifies that L eff $\approx$ L for L being a few meters.

In the visible or near infra-red wavelength, the light transmitted by the fibre should be monomode in order to maintain the spatial coherence of laser light. This has as consequence that:

$$2\pi a\ NA/\lambda < 2.401 \quad (3)$$

wherein a is the dimension of the radius of the core (the core being substantially circular shaped), NA the numerical aperture of the fibre and $\lambda$ the wavelength of the transmitted light. The numerical aperture being defined as $$NA = \sqrt{(n_c^2 - n^2_{m1})} \quad (4)$$

wherein $n_c$ and $n_{m1}$ are the refractive indices of the core (first refractive index) respectively of the first cladding (second refractive index) $n_{m2}$ being the third refractive index of the second (4) cladding but which has no real effective contribution to the numerical aperture.

The $\sin^{-1}$ (NA) defines the maximum input angle along which the light is coupled into the fibre. This signifies that the input angle is relevant for the transmitting properties of the fibre. Based on these constraint, commercially available optical fibres generally have a value NA=0.1. Referring to expression (3), it can be shown that the value of a is limited to $1.5 \leq a \leq 2$ $\mu$m, which leads to values of $P_B = 700$ mW for $480 \leq \lambda \leq 500$ nm and L=5 m.

In order now to increase the Brillouin scattering threshold and consequently to enable light with a power higher than 700 mW to be transported by the fibre, the present invention proposes to reduce the numerical aperture NA while maintaining the monomode character of fibre and without affecting the transmission efficiency which is situated between 70 and 80%.

For this purpose the values of the refractive indices $n_c$, $n_{m1}$ and $n_{m2}$ of the core, the first and second cladding have been chosen in such a manner that NA<0.1 with a core radius a >2 $\mu$m. Preferably NA=0.055 and a=3 $\mu$m. To obtain such values a fibre structure having preferably $n_c > n_{m1}$ and $n_{m2} = n_c$ is chosen. The difference between $n_c$ and $n_{m1}$ should preferably be $10^{-3}$. This is obtained for example by using a core and a second cladding which are made of pure silica whereas the first cladding is made of doped silica. In such a manner, the transparent dielectric materials forming the fibre are compatible with each other and the value of $n_{m1}$ can be determined by the appropriate choice of the doping material. The chosen doping material is for example boron or fluorine. Silica is an appropriate material for the core and the second cladding as it enables to minimise absorption losses.

By limiting the numerical aperture and increasing the core radius, the constraints of a monomode fibre are respected since $2\pi a\ NA/\lambda < 2.401$. Since the numerical aperture is however reduced, the incident angle decreases enabling, with a larger core radius, more powerful light to be coupled into the fibre.

Table A represents in function of the injected power, the power transmitted by 4 optical fibres according to the invention, of different lengths (1.5 m, 3.8 m, 5 m, 10.9 m) having low numerical apertures (LNAF), NA value of 0.055 and core radius of 3 $\mu$m. The laser beam used is a continuous Nd:YAG emitting at 532 nm of wavelength with a maximum power of 5.5 W. It appears that saturation effect due to Brillouin scattering effect is reached for the 10.9 m fibre with an average value of 2.5±0.05 W of transmitted power. One thus can deduce a Brillouin scattering effect constant $C_{br}$ of 27.3±0.5 Wm.

It follows that, applying the expression $P_B = C_{br}/L_{eff}$, the Brillouin scattering threshold would be about 5.5 W for the 5 m fibre This is up to about 10 times larger than classical fibres having core radii values of about 1.5 $\mu$m. It can be concluded that the value of $P_B$ is not only determined by the core section of the fibre since this parameter would have led to a factor 4 instead of about 10, but also by the material used for the said core, that is pure silica according to the invention, as well as by the geometry of the fibre.

A same laser beam has been used with a light power of 5 w to submit the aforementioned 3.8 m optical fibre to a continuous strain test during 1000 h. No noticeable degradation of the transmission characteristics of the fibre resulted from this test. This indicates that the time scale for measuring a significant strain effect on the fibre is presumably of a larger magnitude (of the order of 10000 h).

A damage resistance test under high coupled light power has also been conducted with the here above considered fibre. The latter has been coupled with 10 W power light emitted at 532 nm by a Nd:YAG laser beam during 24 h. No visible degradation (thermomechanic effect leading to breakage of the fibre entry, opacity of the core) appeared. On the other hand, classical fibres endure such a degradation after even less than 100 h at 2 W light power. Power and time being proportional, the test conducted with the fibre according to the invention represents 120 h at 2 W. Since the core section of the latter is not more than 4 times larger than that of classical fibres, it can be concluded that the high resistance of the said fibre is not only due to its core section but also to the material constituting the said core, that is pure silica.

TABLE A

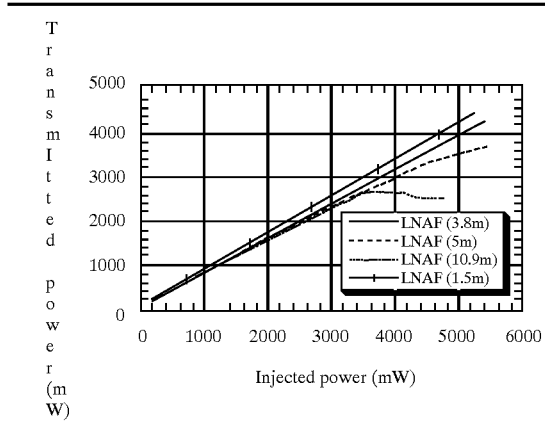

Injected power (mW)

Figure 2:
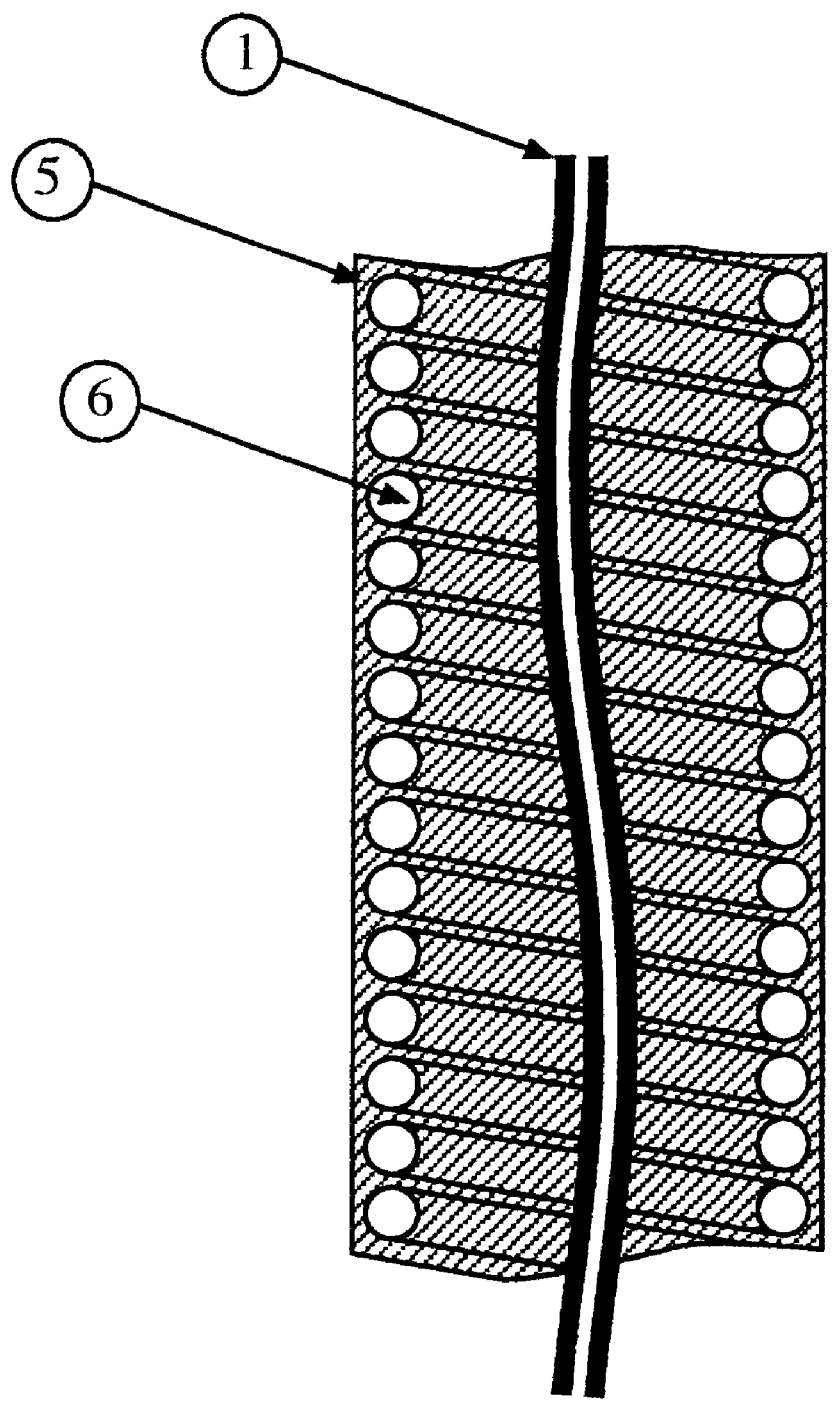
FIG. 2 illustrates the optical fibre with the resilient material applied around.

FIG. 2 shows a further embodiment of the optical fibre 1 according to the present invention, wherein the core and both claddings are enveloped with a resilient material 5 in such a manner as to limit the bending radius r of the fibre to minimum 5 cm. Indeed, if the bending radius exceeds 5 cm, the light travelling through the fibre is too heavily bent so that losses due to reflections inside the fibre would occur. Moreover, a too heavy bending of the fibre could irreversibly deform the core or break the cladding. Besides limiting the bending, the resilient material also protects the core and the claddings.

The resilient material 5 should also be resistant to impacts and mechanical elongation. Preferably, a polymer is used as resilient material 5. To further improve the resistance, a spring 6 is preferably enrolled around the second cladding. The spires of that spring being embedded into the resilient material 5. The spring is preferably made of metal and enables a bending of the fibre while maintaining the internal volume free i.e. the place where the core and the claddings are located.

Figure 3:
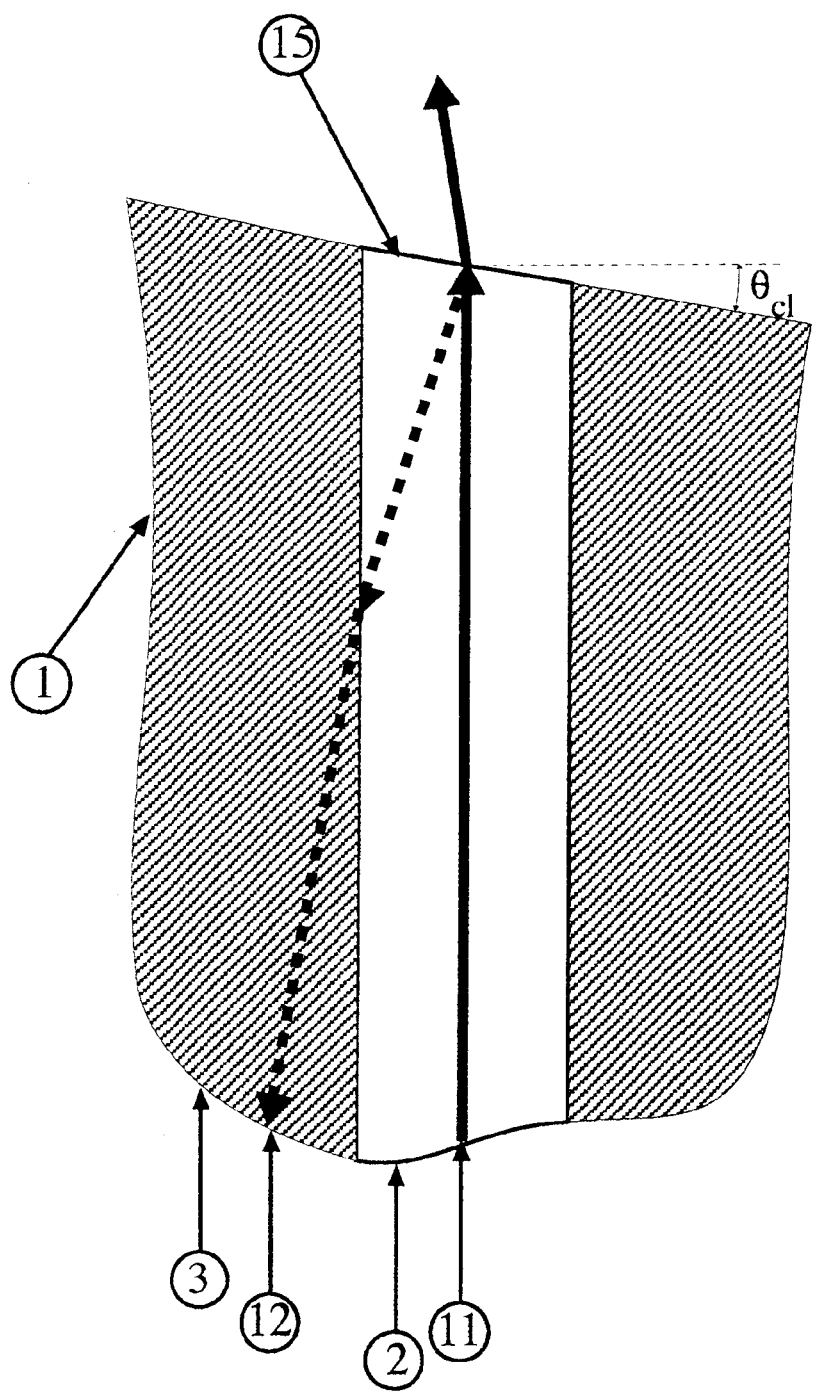
FIG. 3 shows the end-wall of the optical fibre without end-piece.

As illustrated in FIG. 3, the end-wall 15 of the fibre 1 has an inclined end-face in order to eliminate Fresnel reflections at the end-wall. The minimum inclination angle is determined by $$\theta > \frac{1}{2}\left[\frac{\pi}{2} - a\sin\left(\frac{n_c}{n_m}\right) + a\sin\left(\frac{NA}{n_c}\right)\right].$$

Depending on the values of NA and $n_c$, the inclination angle should be at least 2°. Preferably a value $\theta=4°$ is chosen with respect to the central core axis 11 in order to avoid that light 12 reflected against the end-wall would be coupled back in the core and the cladding. The choice of that inclination angle also contributes to reduce the Brillouin scattering threshold. Indeed, the reflected light 12 initiates the Brillouin effect in that it attenuates the propagated light.

Figure 4:
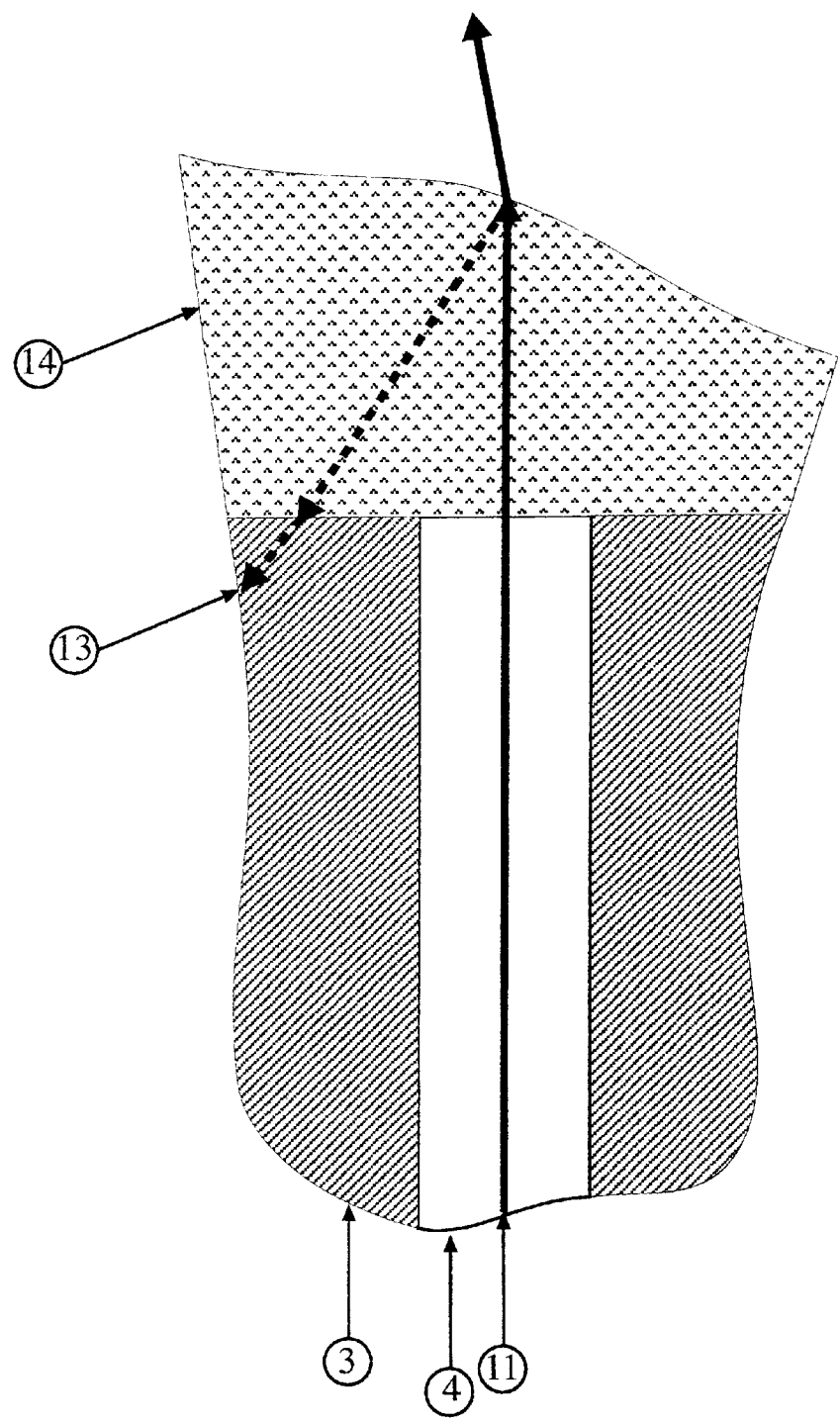
FIG. 4 shows the end-wall of the optical fibre provided with transparent material.

Experiments have proven that the fibre according to the invention enables to transport laser light with a wavelength $500 \leq \lambda \leq 550$ nm over 5 m with a power of at least 4W and an efficiency of 70 to 80%. Other techniques such as anti-reflection treatment, tin multi-layers or the addition at the end-wall (see FIG. 4) of a transparent material 14 deflecting reflected light 13 outside the main axis 11 could also be applied to reduce the Brillouin scattering threshold.

Figure 5:
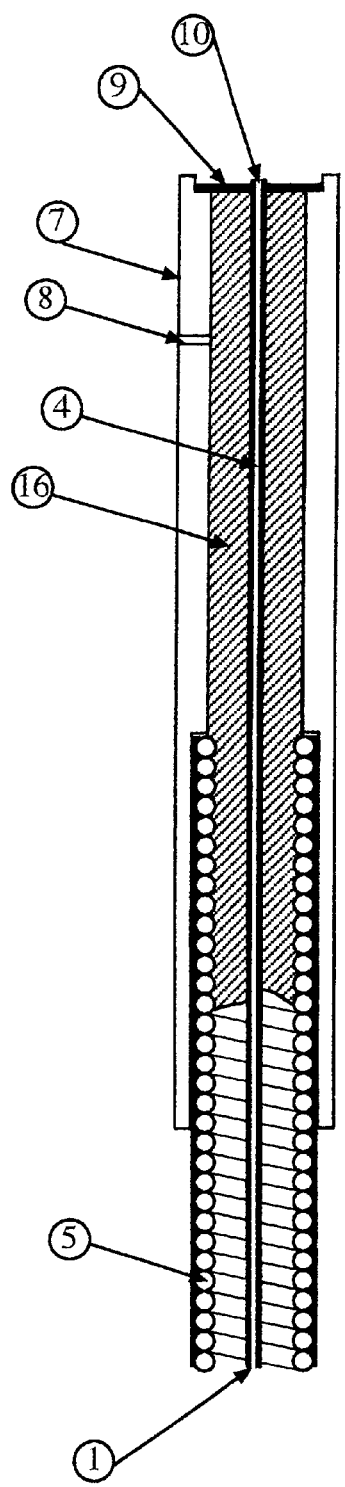
FIG. 5 shows the optical fibre provided with its end-piece.

FIG. 5 shows the monomode optical fibre according to the present invention and provided with an end-piece 7. The end-piece serves as an auxiliary tool for coupling the light into the core. The presence of a core surrounded by the first and second cladding and the small numerical aperture renders coupling between the laser source and the fibre difficult. A bad coupling will lead to light being coupled into the cladding and thus to a loss of the coherence in space. The end-piece or mandrel 7 according to the present invention enables to facilitate the coupling and reduce the loss.

The end-piece comprises a rigid cylindrical tube forming a cavity into which the cladding 4 is inserted. At a bottom of that cavity a hole 10 formed inside a plate 9 is applied. The fibre exits through that hole. The cavity is filled with a transparent material, preferably epoxy resin, having a higher refractive index than the one of the core or the second cladding. That transparent material is applied via a further hole 8 applied in a lateral side of the end-piece.

In such a manner, the light coupled into the second cladding can escape before reaching the end of the fibre. Indeed, since the refractive index of that material is higher than the one of the second cladding, the light can escape as it does no longer feel a total reflection

What is claimed is:

1. A monomode optical fibre provided for transporting light having a wavelength $\lambda$ with $480 \leq \lambda \leq 550$ nm, said fibre comprising a core made of a first transparent dielectric material, having a first refractive index $n_c$ and a substantially circular cross-section with a radius dimension a, said fibre further including a first cladding coaxially applied on said core and made of a second transparent dielectric material having a second refractive index $n_{m1}$, wherein $n_{m1} < n_c$, and the first transparent dielectric material consists in substantially pure silica, the second transparent dielectric material consists in doped silica, the thickness of said first cladding is in a range of 5 to 15 mm, the values of $n_c$ and $n_{m1}$ are chosen in such a manner that the numerical aperture (NA= $\sqrt{n_c^2 - n_{m1}^2}$) is less than 0.1, and said radius dimension a is above 2 mm.

2. The monomode optical fibber as claimed in claim 1, wherein the doping agent of the said second transparent dielectric material is chosen amongst fluorine and boron.

3. The monomode optical fibre as claimed in claim 1, wherein said doping agent is present in the second transparent dielectric material in a molar concentration range of 1 to 3 percents.

4. The monomode optical fibre as claimed claim 1, wherein the numerical aperture NA of the fibre is above 0.03.

5. The monomode optical fibre as claimed claim 1, wherein said fibre further comprises a second cladding coaxially applied on said first cladding and made of a third transparent dielectric material having a third refractive index $n_{m2}$, wherein $n_{m2} > n_{m1}$.

6. The monomode optical fibre as claimed in claim 5, wherein said first refractive index $n_c$ and said third refractive index $n_{m2}$ have a same value.

7. The monomode optical fibre as claimed in claim 5, wherein said third transparent dielectric material consists in substantially pure silica.

8. The monomode optical fibre as claimed in claim 1, wherein said fibre is enveloped with a resilient material in such a manner as to limit the bending radius of the fibre to minimum 5 cm.

9. The monomode optical fibre as claimed in claim 8, wherein a spring is embedded in said resilient material, the spires of said spring being enrolled around the second cladding.

10. The monomode optical fibre as claimed in claim 8, wherein said resilient material is formed by a polymer.

11. The monomode optical fibre as claimed claim 1, wherein an extremity of the fibre is provided with an end-piece having a cavity for receiving said extremity, a bottom of said cavity being provided with a hole through which said core extends.

12. The monomode optical fibre as claimed in claimed 11, wherein said cavity is further filled up with transparent material having a higher refractive index than said third refractive index.

13. A monomode optical fibre for transporting light having a wavelength $\lambda$ with $480 \leq \lambda \leq 550$ nm, said fibre comprising:

a core made of a first transparent dielectric material, having a first refractive index $n_c$ and a substantially circular cross-section with a radius dimension a, said fibre further including a first cladding coaxially applied on said core and made of a second transparent dielectric material having a second refractive index $n_{m1}$, wherein $n_{m1} < n_c$, the first transparent dielectric material consists in substantially pure silica, the second transparent dielectric material consists in doped silica, the thickness of said first cladding is included in a range of 5 to 15 mm, the values of $n_c$ and $n_{m1}$ are chosen in such a manner that the numerical aperture (NA= $\sqrt{n_c^2 - n_{m1}^2}$) is less than 0.1 and said radius dimension a is above 2 mm, an end-wall of the fibre has an inclined end-face having an inclination angle q>

$$\theta > \frac{1}{2}\left[\frac{\pi}{2} - a\sin\left(\frac{n_c}{n_m}\right) + a\sin\left(\frac{NA}{n_c}\right)\right].$$

* * * * *